D. W. TRAVIS.
Potato-Diggers.

No. 146,726.

Patented Jan. 20, 1874.

WITNESSES

INVENTOR

UNITED STATES PATENT OFFICE.

DUDLEY W. TRAVIS, OF ITHACA, NEW YORK.

IMPROVEMENT IN POTATO-DIGGERS.

Specification forming part of Letters Patent No. 146,726, dated January 20, 1874; application filed October 10, 1873.

*To all whom it may concern:*

Be it known that I, DUDLEY W. TRAVIS, of Ithaca, in the county of Tompkins and State of New York, have invented certain new and useful Improvements in Potato-Diggers; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in potato-diggers; and it consists in attaching to the rear shovel a removable bar or cross-piece, having a number of chains attached to it, which drag behind in the furrow and draw the potatoes out.

Figure 1:
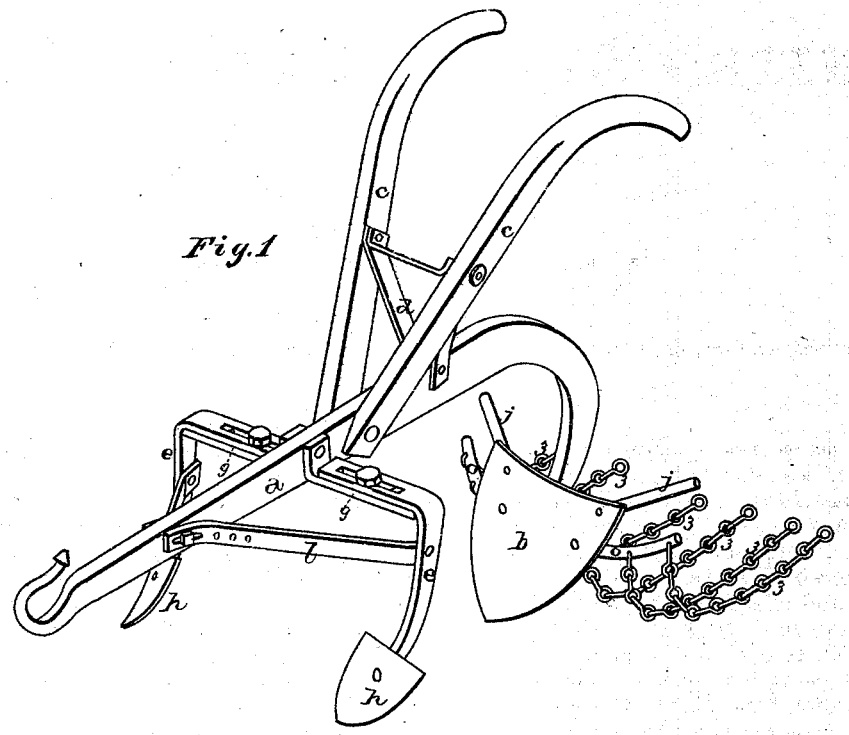
Figure 2:
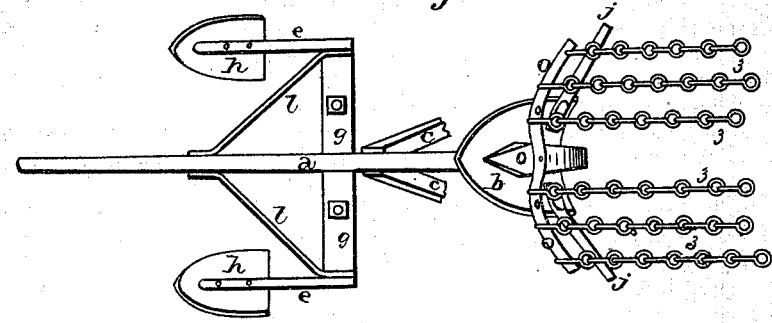

Figure 1 is a perspective view of my invention. Fig. 2 is an inverted view of the same.

$a$ represents the beam of the cultivator, having the shovel $b$ secured to its rear end, and the handles $c$ to its center, and braced by the braces $d$. To each side of the beam is fastened an arm, $g$, which projects outward at right angles to it, and to which the standards $e$ are attached. These standards have their upper ends bent so as to rest upon the top of the arm $g$, and are slotted, or have a series of holes made in them, so that the standards can be moved nearer to, or farther from, the beam $a$. The shovels $h$, attached to these standards, are turned outward, so as to throw the earth away from each side of the row, so that the rear shovel, which is placed midway between them, lays the row open, uncovering the potatoes. Each of the standards are braced by the braces $l$, having a number of holes made through them, so that they can be adjusted with the standards. To the rear sides of the shovel $b$, at or near the top edges, are secured the removable rods or bars $j$. Just below these bars is secured a bar, $o$, which is also removable at will, and which is long enough to project out beyond each side of the shovel. To this bar are secured a number of chains, 3, which drag behind in the furrow, and not only loosen the potatoes, but draw them to the top in the middle of the furrow.

By removing the two bars $j$ $o$, the machine may be used as a cultivator.

Having thus described my invention, I claim—

In combination with the shovel $b$, the removable bar $o$ and chains 3, substantially as shown and described.

In testimony that I claim the foregoing I have hereunto set my hand this 9th day of October, 1873.

D. W. TRAVIS.

Witnesses:
F. A. LEHMAN,
WM. HALE.